Dec. 17, 1957 A. KAUFMANN 2,816,425
KNITTING MACHINE FOR HOME USE
Filed April 19, 1955 8 Sheets-Sheet 1
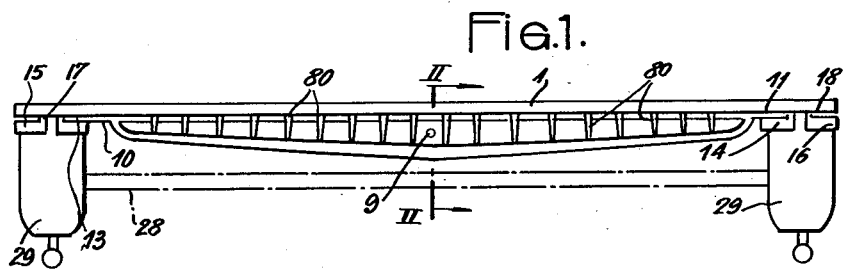
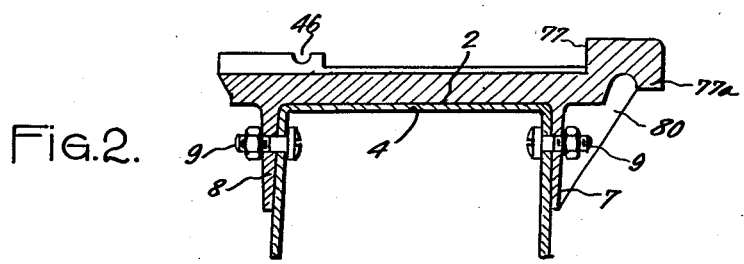
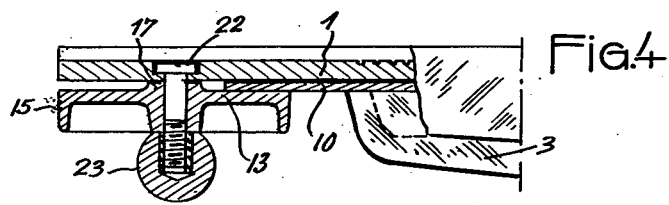
INVENTOR
ARTHUR KAUFMANN Dec. 17, 1957 A. KAUFMANN 2,816,425
KNITTING MACHINE FOR HOME USE
Filed April 19, 1955 8 Sheets-Sheet 2
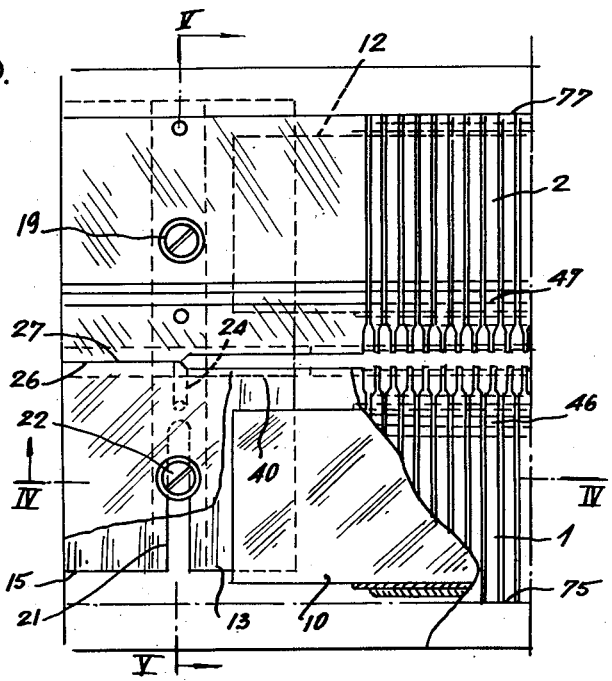
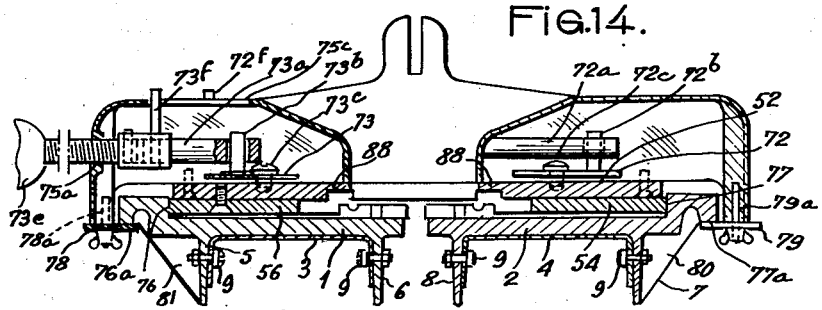
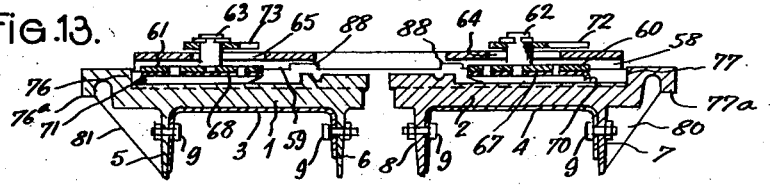
INVENTOR
ARTHUR KAUFMANN

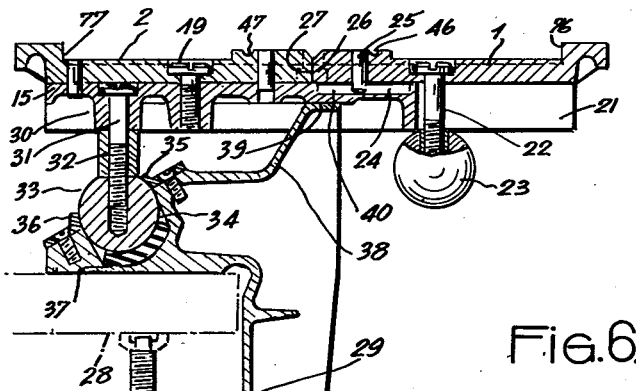
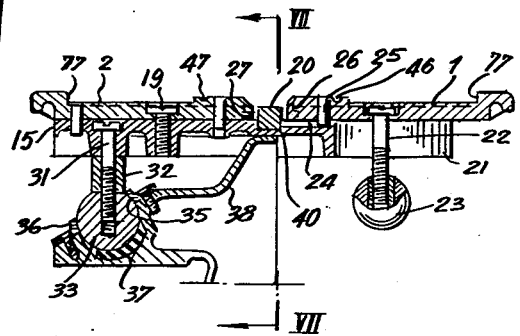
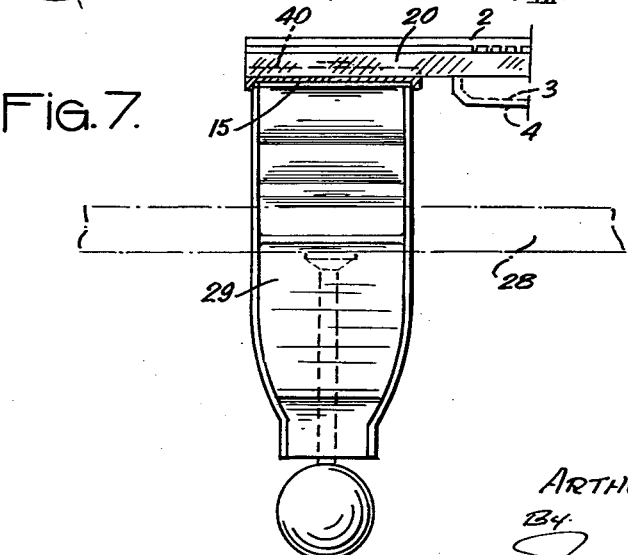

Dec. 17, 1957  A. KAUFMANN  2,816,425
KNITTING MACHINE FOR HOME USE
Filed April 19, 1955  8 Sheets-Sheet 4

INVENTOR
ARTHUR KAUFMANN

Dec. 17, 1957  A. KAUFMANN  2,816,425
KNITTING MACHINE FOR HOME USE
Filed April 19, 1955  8 Sheets-Sheet 6
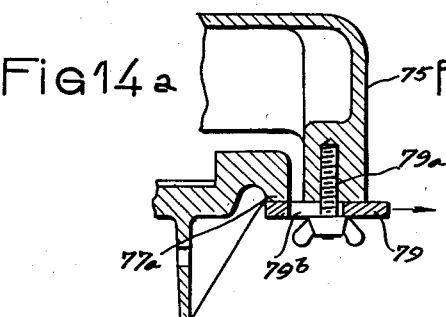
Fig 14a.
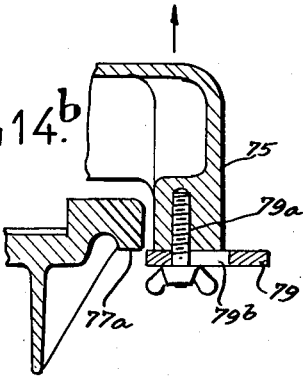
Fig 14b.
Fig. 12a.
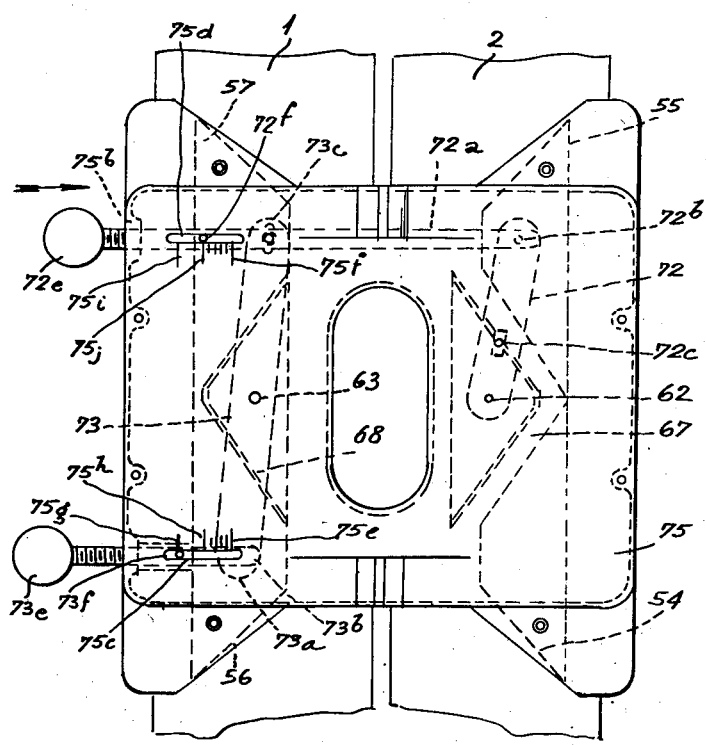
INVENTOR
ARTHUR KAUFMANN Dec. 17, 1957  A. KAUFMANN  2,816,425
KNITTING MACHINE FOR HOME USE
Filed April 19, 1955  8 Sheets-Sheet 7

INVENTOR
ARTHUR KAUFMANN
BY

Dec. 17, 1957  A. KAUFMANN  2,816,425
KNITTING MACHINE FOR HOME USE
Filed April 19, 1955  8 Sheets-Sheet 8
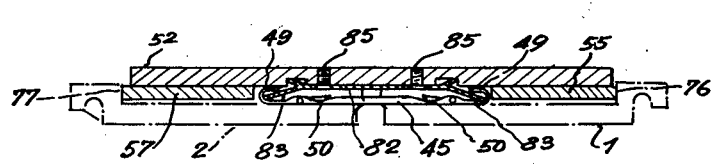
Fig. 18.
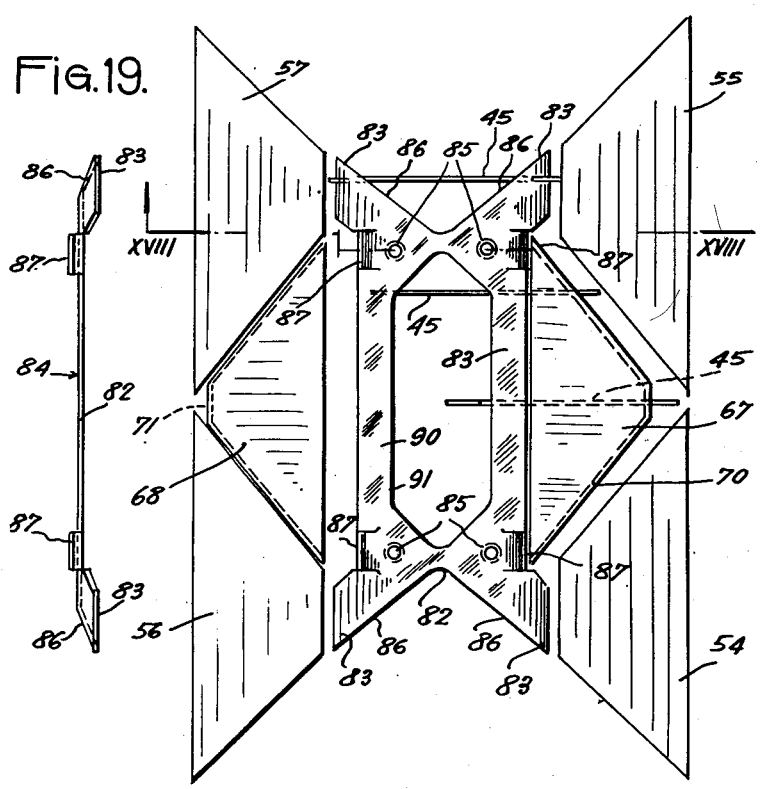
Fig. 17
Fig. 19.
INVENTOR
ARTHUR KAUFMANN

2,816,425

KNITTING MACHINE FOR HOME USE

Arthur Kaufmann, Neuilly-sur-Seine, France

Application April 19, 1955, Serial No. 502,327

Claims priority, application France April 21, 1954

17 Claims. (Cl. 66—63)

This invention relates to home knitting machines, commonly called "purl stitch machines," which comprise two needlebeds slightly separated from each other which enable knitting to be produced with purl or plain stitches, at the user's will.

According to the invention, longitudinal ribs moulded with the part are under the internal face of each needlebed and fit into sections forming the framework of each needlebed, these needlebeds being fixed on the sections by bolts placed in the middle transversal plane of each needlebed.

Various other characteristics of the invention will furthermore be revealed in the following detailed description.

One form of embodiment of the purpose of the invention is shown, by way of example, in the attached drawings.

Figure 1 is a longitudinal elevation view of the front needlebed of the machine and its stiffening framework.

Figure 2 is a cross-section on a larger scale, taken through the line II—II of Figure 1.

Figure 3 is a flat view of one of the ends of the machine and showing, partially cut away, various members of said machine.

Figures 4 and 5 are sections taken along the lines IV—IV and V—V respectively of Figure 3.

Figure 6 is a view similar to Figure 5, on a reduced scale, and shows the needlebeds separated from each other, with the rule for "Jacquard" work in position.

Figure 7 is a section taken along the line VII—VII of Figure 6.

Figure 12a is a plan view of the carriage provided with its casing.

Figure 13 is a section along the line XIII—XIII of Figure 12.

Figure 14 is a section along the line XIV—XIV of Figure 12, the casing being fitted on the carriage.

Figures 14a and 14b are detail views, on a larger scale, of Figure 14.

Figure 17 is a plan view of the carriage, the support plate being presumed removed, this view moreover showing the cams forming locks and the central plate for opening and maintaining the blades of the needles.

Figure 18 is a cross-section taken along the line XVIII—XVIII of Figure 17.

Figure 19 is a profile view of the central plate shown in Figure 17.

Figure 8:
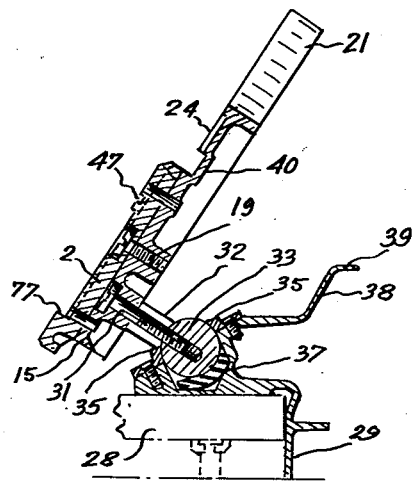
Figure 8 shows the rear needlebed in the raised position.

Referring now to the drawings in detail, each of the needlebeds 1 and 2 is strengthened respectively by a U-section 3 and 4, these sections being fixed under the bottom face of the needlebeds by bolts 9.

Now, the needlebeds are made of moulded plastic material, whereas the sections are of metal. As these two materials do not possess the same linear thermal expansion coefficients, there is a risk of distortion for the needlebeds fixed on the sections, these distortions causing irregularities of the working surface of the needlebeds, which are incompatible with the proper working of the machine.

According to this invention, and with a view to obviating this disadvantage, means are provided for strengthening the needlebeds in a manner that will be explained.

The sections 3 and 4 are engaged between the longitudinal ribs 5 and 6 for the needlebed 1, and 7 and 8 for the needlebed 2, these ribs being moulded with said needlebeds as will be more clearly seen in Figure 14.

The sections 3 and 4 thus positioned between the ribs of each needlebed are assembled to the latter by bolts 9 (Figures 1 and 2). Each pair of bolts connected to each of the needlebeds is placed in the middle transversal plane of the needlebeds (Figure 1).

The ends of the sections 3 and 4 are cut so as to provide extensions 10, 11 for the needlebed 1 and extension 12 for the needlebed 2.

These extensions rest (Figures 3 and 4) on bearing surfaces 13 and 14 provided on the crossbars 15 and 16 for maintaining the needlebeds 1 and 2 side by side for certain works to be done, or, on the other hand, to keep the needlebeds apart from each other for other works to be done.

Each of the needlebeds 1 and 2 rests, by its ends on raised bearings 17, 18 provided on said crossbars, the height of these bearings being so arranged as to enable the free sliding of the extensions 10 and 11 of the sections 3 and 4 and the corresponding extensions of Figure 2. Figure 4 shows more particularly the extension 10 of the section 3 resting on the crossbar 15 which moreover supports the needlebed 1.

Owing to this method of mounting, according to which the sections 3 and 4 are assembled to the needlebeds 1 and 2 in the median plane of the latter, it will be understood that the needlebeds and sections can expand independently of each other, the needlebeds, however, being suitably supported over their entire working length by said sections.

The rear needlebed 2 is fixed, by each of its ends, to the crossbars 15 and 16 by means of a screw 19 (Figures 3, 5, 6 and 8), this needlebed being thus permanently associated with the end crossbars 15 and 16.

On the other hand, the front needlebed 1 is fitted slidably and is movable on the crossbars 15 and 16 so as to be able to be deviated from the needlebed 2 and, if so required, to be withdrawn, by detaching it from the crossbars 15 and 16, so as to leave the needlebed 2 alone in service.

According to this invention, means are provided for limiting the recoil stroke of the needlebed 1 to convey it to a suitable distance from the needlebed 2 so as to enable the rule 20 to be positioned, which is required for making "Jacquard" knitting (Figures 6 and 7), these means, however, by an additional manoeuvre, enabling the needlebed 1 to be freed for effecting its withdrawal from the machine.

According to one embodiment of this invention, each of the crossbars 15 and 16 is provided with a slot 21 emerging on the front edge of the crossbar (Figures 3 and 5) and in which slot the rod 22 of a screw is engaged bearing on the needlebed 1 and to whose end a sphere-shaped nut 23 is screwed to ensure the pressing of the needlebed 1 on the crossbar 15 (or 16) and thus rendering said needlebed motionless with regard to said end crossbars.

Furthermore, each of the crossbars 15 and 16 is provided with a groove 24 (Figures 3 and 5) to engage the end of a lug 25 which is integral with the needlebed 1. The length of the groove 24 is such that by sliding the end of the lug 25 in said groove, it is possible to bring the needlebed 1 into a working position in the vicinity of the needlebed 2, such position being determined by the pressure, one against the other, of the two bearings 26 and 27 of the needlebeds 1 and 2 respectively (position shown in Figure 3 and Figure 5), or, on the other hand, to bring the needlebed 1 into a position away from the needlebed 2 (Figure 6) so as to allow the rule 20 to be positioned for effecting knitting comprising "Jacquard" designs.

Actually, presuming that the needlebeds are arranged close to each other, as shown in Figures 3 and 5, it is only necessary, to bring the needlebed 1 into the position of Figure 6, to slightly unscrew the nut 23 so as to be able to slide the needlebed 1 along the crossbars 15 and 16 until the end of the lug 25 abuts against the bottom of the groove 24 (Figure 6). The needlebed being brought into that position, it is only necessary, to be able entirely to disengage the machine, to unscrew the nut 23 still farther, as shown in Figure 6, to enable, by a slight pivoting movement of the needlebed 1 upwards, to free the end of the lug 25 from the groove 24.

This arrangement has the advantage that when the position of the needlebed 1 is changed, it prevents the needlebed 1 from being accidentally pushed back in an excessive manner, by bringing it into such a position that it might tip with regard to the crossbars 15 and 16, and run the risk of falling.

According to one embodiment of this invention, provision is made for fixing the machine to the work table on which it is to be mounted, this table being indicated by broken lines at 28, by means of brackets 29 (Figures 1, 5 and 7) which are so devised as to allow the crossbars 15 and 16 to pivot in a vertical plane to bring them into an oblique position with regard to the table, as shown in Figure 8.

To this end, each of the crossbars 15 and 16 (see Figure 5) comprises a boss 30 in which a screw 31 is engaged, traversing a brace sheath 32 and screwing into a sphere 33. This sphere is engaged in a housing 34 provided on the upper flange of each of the brackets 29 and is held in its housing like a ball-and-socket joint by semi-races 35 and 36. Furthermore, this sphere 33 rests on a packing 37, advantageously made of synthetic rubber, this material allowing free rotation of the sphere, while ensuring a certain amount of gripping of the latter, thus avoiding too great a freedom of movement of the sphere. The upper platform of the bracket 29 is extended by an arm 38 comprising a bearing surface 39, on which the bottom face of the corresponding crossbar 15 (or 16) (Figures 5 and 6), rests.

The mounting described above, enables the crossbar assembly 15 and 16 to pivot around a horizontal axis passing through the centre of the spheres 33, so as to bring said crossbars into a sloping position with regard to the table 28 (Figure 8), which allows the under face of the needlebeds to be easily examined, or the knitting extending under the needlebeds. The two needlebeds fixed on the crossbars (or only the needlebed 2, if the needlebed 1 is withdrawn) can be brought into this sloping position as shown in Figure 8.

In either case, one can be sure, by means of the action of the packing 37, of obtaining definite stability of the needlebed or needlebeds in the sloping position.

It has already been stated that for certain work requiring the needlebeds to be kept apart, a rule 20 was provided between said needlebeds.

This rule is held in position by embedding its ends in grooves 40 provided on the upper face of the crossbars 15 and 16 (Figures 3, 5, 6 and 7).

Figure 10:
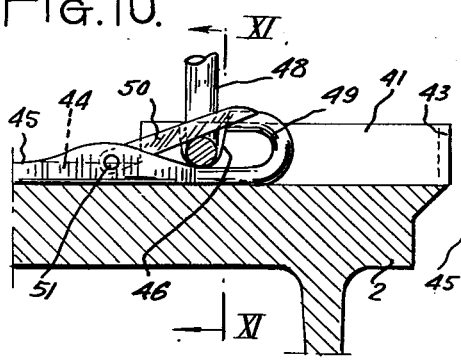
Figure 10 is a section along the line X—X of Figure 9.
Figure 11:
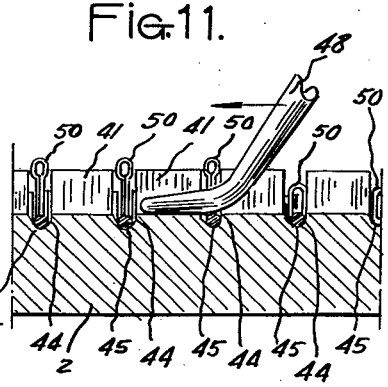
Figure 11 is a section along the line XI—XI of Figure 10.
Figure 9:
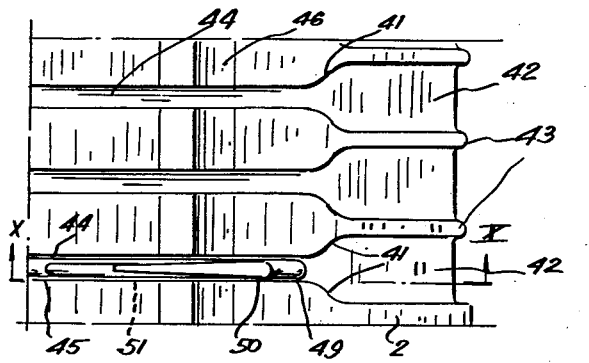
Figure 9 is a larger scale plan detail view of one of the needlebeds.

According to another feature of this invention, the joining faces 41 of the cavities 42 comprised between the jacks 43 of each of the needlebeds (Figures 9 and 10) have a rounded and sloping shape so as to fit in with the grooves 44 in each of which a needle 45 can slide, each needle being provided with a hook 49 at both ends by which the needle is controlled. This particular shape of the faces of the cavities 42 facilitates the translation movement of the needles when they pass from one needlebed to another.

Moreover, each of the needlebeds comprises, at a certain distance from the jacks 43, a flange that is of appreciably semi-circular shape 46 for needlebed 1 and 47 for needlebed 2 (Figures 2, 3, 5, 6, 8, 10, 11, 13 and 14). These flanges are of a depth so that when the needles 45 are put into position in the grooves 44 (Figures 10 and 11), the bottom of each flange just touches on the upper edge of the needles, and this, in particular, where the hook of the latter comes.

Under these conditions, when the needles are placed in the grooves of a needlebed so that the backs of the hooks are in the vicinity of the working edge of the needlebed, it is only necessary to make the end of an ordinary punch 48 slide in the flange 46 or 47 corresponding to the needlebed in use, to effect, by the successive engaging of this end of the punch under the blades 50 of the needles (Figure 11), the raising of the blades and then their lowering on the body of the needles, by pivoting each of the blades 50 around its pivot 51, the hooks having remained open. This operation, which can be very rapidly performed before the carriage is moved, allows the user to make certain that all the blades are down. Hence, the risks are eliminated either of damage to the needles or needlebeds, when the carriage is to be moved along the latter.

It will thus be seen that the maintenance of the blades in a suitable position is ensured under the carriage by the action of a particularly shaped part.

Figure 12:
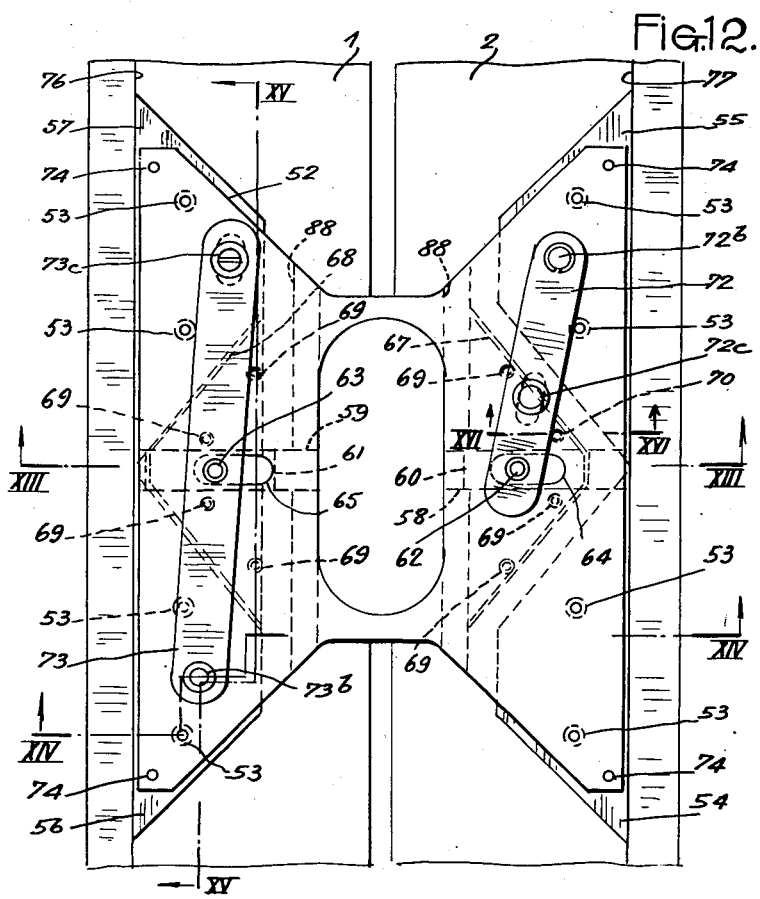
Figure 12 is a plan view of the carriage, the casing being presumed to be removed.

According to the invention, the carriage comprises essentially a support plate 52, shown in plan in Figure 12. On this plate 52 the press cams 54 and 55 for the needlebed 2 and 56 and 57 for the needlebed 1 (Figures 12 and 17), are permanently fixed.

In its median transversal plane, the support plate 52 is provided with two grooves 58 and 59 (see Figures 12 and 13), in which small slides 60 and 61 respectively are engaged, these slides each being integral with lugs 62 and 63 respectively which can be moved longitudinally in slots 64, 65 respectively, traversing the support plate 52.

The gathering cams 67, 68 are fixed on the slides 60 and 61, the cam 67 being applied to needlebed 1 and the cam 68 to needlebed 2.

Figure 15:
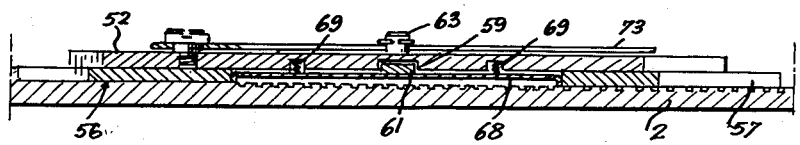
Figure 15 is a section along the line XV—XV of Figure 12.
Figure 16:
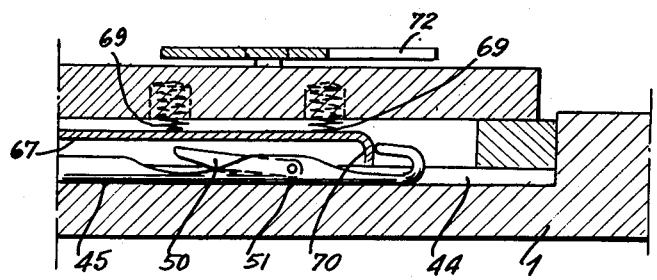
Figure 16 is a section, on a larger scale, along the line XVI—XVI of Figure 12.

In order to ensure a certain bearing flexibility of the leading edge of the gathering cams on the working face of each needlebed, the cams are made to apply resiliently on the needlebeds and, to this end, springs 69 are provided, engaged and maintained in holes drilled in the support plate 52 (Figures 15 and 16).

Both of the gathering cams are made of a steel plate provided with bevelled edges on their periphery, shown at 70 for the cam 67 and 71 for the cam 68. These bevelled edges form the leading edges of the cams, as will be seen in Figure 16 where the edge 70 is in position to cause the needle 45 to slide in the groove 44 of the needlebed 1 by acting on the hook 49 of that needle. Owing to this particular shape, the edge of the gathering cam that rests on the needlebed permits, however, free passage under the cam, of the needles, and in particular, the blades of the latter (Figure 16) which blades are, moreover, held in the lowered position on the body of the needles.

The displacement of the cams, to bring them from the work position occupied by the cam 67 to the non-knitting position occupied by the cam 68, is ensured by rods connected to connecting-rods 72 and 73 shown in Figure 12. The latter are so mounted that the displacement of their respective control rods, in the same direction, determines, for each of the gathering cams 67 and 68, the same forward and backward movement with regard to the corresponding fall of the cams.

By referring to Figure 12a we see at 72a and 73a the control rods of the cams 67 and 68 respectively. These rods are hinged on pivots 72b and 73b carried by the connecting-rods 72 and 73 which are pivotally mounted on fixed points of the plate 52 of the carriage at 72c and 73c. The connecting-rods 72 and 73 are hinged on the cams 67 and 68 respectively by means of the aforementioned lugs 62 and 63.

As will be seen, the connecting-rod 72 acts like a first-order lever (inter-support) whereas the connecting-rod 73 acts as a second-order lever (inter-resisting).

This inversion of the position of the pivoting points of the connecting-rods thus enables—for a movement in the same direction of the rods 72a and 73a—the determining of the displacements in the opposite direction of the cams 67 and 68, and hence the symmetrical arrangement of said cams with regard to the median longitudinal plane of the carriage, to separate the fall cams from the two gathering cams or inversely, to bring said cams closer together.

The rods 72a and 73a comprise threaded parts screwed into fixed nuts formed by tapped holes made at 75a and 75b on the carriage casing. These rods are arranged so that their threaded part can turn, although said rods are connected by their end to the corresponding connecting rod 72 or 73.

With their ends arranged outside the carriage, the threaded rods are each integral with an operating button advantageously formed by a sphere, as shown at 72e and 73e. Finally, the non-revolving part of the rods 72a and 73a is provided with a lug 72f and 73f respectively these lugs being engaged in lengthened slots or buttonholes 75c and 75d made in the casing 75, so that the ends of the lugs 72f and 73f are visible on top of the casing, which allows, by direct visual control, the position to be ascertained of each of the gathering cams 67 and 68 with regard to the corresponding fall cams.

A scale 75e and pointers 75g and 75h for the slot 75c corresponding to the front needlebed and a scale 75f and pointers 75i and 75j for the slot 75d corresponding to the rear needlebed, show the relative positions of the cams 67 and 68 with regard to the fall cams.

The pointers 75g and 75i are advantageously completed by the indication "cancelled," the pointers 75h and 75j by the indication "slack" and the final pointer of the scales 75e and 75f by the indication "tighten," these showing the degree of tightness of the stitches.

In Figure 12a we see the lug 72f placed opposite the pointer 75j and the indication "slack," the gathering cam 67 being in such a position that it causes the forming of long stitches on the hook of the needle working (hook opposite to that controlled by the cam 67). By screwing the threaded part of the rod 72a into the nut 75b, this causes the rod to slide in the direction shown by the arrow f (Figure 12a) which has the effect of separating the gathering cam 67 from the fall cams and consequently reduces the stroke of the needles so that the hook working the latter separate slightly from the leading edge of the jacks of the needle bed, the stitches made being "tightened" as shown by the scale 75f.

In Figure 12a we also see that the lug 73f is placed opposite the pointer 75g and the indication "cancelled." In the position shown in this figure, the cam 68 is pressed against the fall cams and consequently the leading edge of this cam is outside the circuit of the needle hooks. In this example, knitting is thus done on one needlebed only, the rear needlebed 2.

The support plate 52 is directly fixed by the screws 74 to the ribs of the casing of the carriage 75 (Figures 12 and 14), which rests by its own weight on the needlebeds 1 and 2 with which it is in contact by the lower face of the press cams 54, 55, 56 and 57.

The carriage is guided in its movements along the needlebeds by the external edge of the press cams 54, 55, 56 and 57 which, as will more particularly be seen in Figures 12 and 14, are in contact with the internal wall of each of the rims 76 and 77 of the needlebeds 1 and 2 respectively. Thus, the carriage is properly guided and slides gently along the needlebeds, owing to the contact of the metal parts of the carriage with the plastic material of which the needlebeds are made. The carriage is kept in position on the needlebeds by small tongues 78, 79 applied, with suitable play, against the lower face 76a, 77a of the aforementioned rims (Figure 14).

In order to impart a suitable rigidity to these rims, they are connected by ribs 80 and 81 to the longitudinal ribs 5 and 7 of the needlebeds 1 and 2 respectively.

By referring to Figures 14a and 14b we see, on a larger scale, a feature of the fitting of the tongues 78 and 79. The latter are fixed on the lateral rims of the casing 75 of the carriage by butterfly screws 78a, 79a (see also Figure 14) the latter being engaged in slots as shown at 79b in Figures 14a and 14b. It is then possible, in the event of working trouble, after unscrewing the screws 78a and 79a to slide the tongues 78 and 79 to disengage the latter from the rims 76a and 77a, thus freeing the carriage (Figure 14b). The latter can then be raised without involving the needles, to afford access to the needlebeds so that the cams can be examined.

As already mentioned, the carriage rests on the needlebeds and is guided, in its longitudinal movements, by the rims of the latter. We are thus certain that the carriage occupies a well defined position with regard to the needlebeds and that, in particular, the lower faces of the press cams and the leading edge of the gathering cams are at a regular distance from the needles. It is then possible to increase the depth generally given to the guiding grooves of the needles and this enables better guiding to be obtained.

The cams 54 and 55 and the cam 67 shown in Figures 12 and 17 are made of a part of general rectangular shape whose four corners are cut so as to make bevelled catches for ensuring the opening of the poppets or blades of the needles before the hooks of the latter are engaged in the corridor existing between the press cams and the gathering cam when the latter is in the knitting position.

According to this invention, a particular structure is provided for this part, so as to ensure, in an effective manner, its function of opening the blades and keeping them in the lowered position, while the needles are knitting under the carriage.

By referring to Figures 17 to 19, we see at 82 a central plate comprising four catches 83, the latter being sloped downwards with regard to the dorsal face 84 of the plate 82, which is pressed against the support plate 52 by the screw 85 (see Figure 18). The ends of the catches 83 are connected to the plate 82 by an inclined edge 86, and in the vicinity of each screw 85, the plate 82 comprises parts or bosses 87 that are higher than the dorsal face 84. These bosses are intended to engage in grooves 88 provided on the support plate 52, so as to ensure that the plate 82 is securely held on the support 52.

By referring to Figure 18, we see that when the needles 45 abut by the back of their hooks against the internal edges of the press cams, the end of the catches 83 engages under the hooks 49 between the latter and the corresponding blade 50, according as the carriage moves along the needlebeds.

Owing to the effect of the inclined edges 86, the blades are successively raised and caused to pivot around their axle 51, finally assuming the lowered position shown in Figure 18. They are then held in that position right along the catches 83, each of which are connected to the boss 87 afore-mentioned.

As shown in Figure 17, it has been assumed that the needles were moved in their grooves by the action of the gathering cam 67 and that consequently the hook making the stitches was the hook situated on the left of said Figure 17.

By referring to Figure 17, it will be seen that the blades of the needles which have been raised and lowered by the action of the catches 83 provided, in front of the carriage (according to the direction in which it moves along the needlebeds) are—at least as far as the hooks that are knitting are concerned—kept lowered by the strip 90 of the central plate 82, this happening throughout the stroke of the carriage required for bringing the needles into a suitable position for receiving the wool distributed by the distributor, this distribution taking place through the central opening 91 of the plate 82.

In the event of knitting being produced by the action of the hooks situated on the right of Figure 17 (the cam 68 then being in the gathering position), it would be the strip 89 that would ensure that the blades are held in the lowered position with regard to the hooks that are to receive the distributed wool. The central plate 82 being symmetrical with regard to the median transversal plane of the carriage, it follows that whatever the direction in which the carriage moves along the needlebeds, it will be the catches 83 provided towards the front of the carriage (in the displacement direction of said carriage) that will act to lower the blades of the hooks that are to knit and maintain the latter in the lowered position.

Figure 20:
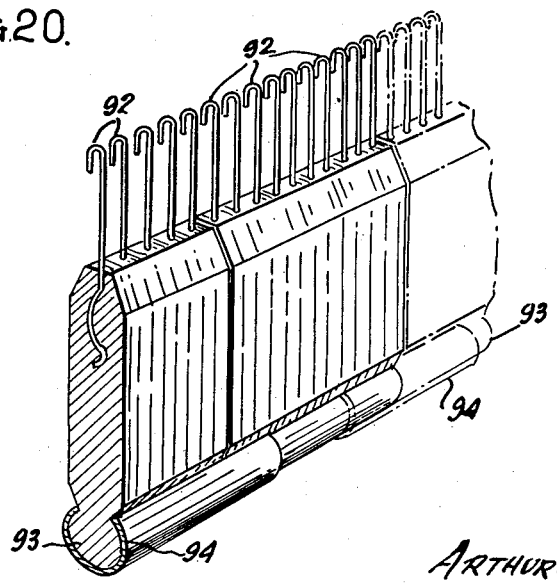
Figure 20 is a perspective view showing an advantageous embodiment of the knitting stretcher comb.

Finally, according to another feature of the invention, provision is made to give the comb for pulling the knitting the arrangement shown in Figure 20. In that figure we see that the teeth of the comb, instead of terminating in a ring as in ordinary cases, conclude in a hook-shaped part 82, and that furthermore, instead of the comb consisting of a single member, whose length is the same as the working length of the needlebeds, it is, according to the invention, made up of several members. These members can be placed side by side and end to end to produce as many teeth as are required by the width of the knitting to be performed. These members are kept in alignment with each other by engaging their lower part, as will be seen at 93, in a split tubular sleeve 94, held by friction on the end 93, but able to slide on the latter so as to cause two members to overlap conjointly, or at least two zones of adjacent ends of these successive members. In order to easily obtain the required length of the comb in keeping with the knitting to be done, members of different length are provided, i. e., comprising numbers of teeth that differ between one member and another, which allows a certain number of combinations of numbers of teeth to be obtained.

It is advantageous to provide the machine with a meter recording and showing at any moment the number of strokes of the carriage, i. e., the number of rows of stitches knitted. It is easy to control a meter of this kind by an oscillating lever angularly moved by the wool distributor every time this distributor changes position.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. A knitting machine for home use, comprising a needlebed of molded plastic material and having integrally formed spaced ribs extending longitudinally from the undersurface thereof, a reinforcing metal framework section approximately coextensive with said needlebed and extending longitudinally along the underside thereof between said ribs and in slidable relation thereto, and fastening means connecting said metal section and said ribs only in the median transverse plane thereof to permit differential expansion and contraction between said needlebed and metal section while maintaining a substantially constant relationship therebetween.

2. A knitting machine according to claim 1, including crossbars for supporting the needlebed, said framework section of the needlebed being shaped at its ends so as to bear on and slide freely on the crossbars.

3. A knitting machine according to claim 1, including a second or rear plastic needlebed provided with a metal framework and crossbars for supporting said second needlebed and framework parallel to the first or front needlebed.

4. A knitting machine according to claim 3, wherein each of the connection crossbars of the needlebeds is provided with a groove to receive and engage the end of a lug carried by the first or front needlebed, the abutting of this lug against the end of the groove ensuring that the front needlebed is held in position, when it is moved from the rear needlebed, and a rule is placed between the two needlebeds for effecting "Jacquard" knitting.

5. A knitting machine according to claim 1, comprising a threaded rod carried by the needlebed at each of its ends and engaged in a groove provided in the front end of each of the crossbars, and spherical nuts on said threaded rods whereby the needlebed may be held in position by the screwing down of the spherical nuts on said threaded rods.

6. A knitting machine according to claim 1, including end crossbars for supporting the needlebed, a bracket, and means for connecting each of the end crossbars of the needlebed to the corresponding bracket including a spherical joint comprising rubber packing between the spheres of each joint and the casing of the latter.

7. A knitting machine according to claim 1, wherein said needlebed comprises, in the vicinity of its working edge, a semi-circular flange provided parallel to this working edge whose depth is such that its bottom reaches level with the upper edge of the needles arranged in the grooves of the needlebed, so that a punch slidably moved in the flange can be inserted between the upper edge of the needle and the hook, under the closed blade of the needle.

8. A knitting machine according to claim 1, including a carriage, said carriage comprising a plate, press cams carried by said plate, external vertical flanges on said needlebed, and means for holding said carriage on the upper face of the needlebed, said means comprising external edges on the cams bearing against the external vertical flanges of the needlebed and tongues bearing against the lower face of the rims of the needlebed.

9. A knitting machine according to claim 8, wherein said tongues bearing against the lower face of the rims of the needlebeds are pierced by apertures for the passage of fixing screws so that the carriage can be removed when these screws are removed.

10. A knitting machine according to claim 9, wherein said cam support plate is provided in its median part with two grooves that are transversally opposed gathering cams, sliding parts fixedly attached to the gathering cams and movable in said grooves, said sliding parts including a lug for cooperation with a pivoting controlling connecting-rod attached to the carriage plate, ensuring the transversal movement of the gathering cams from the knitting position to the retiring position.

11. A knitting machine according to claim 10, including two connecting rods, one of the controlling connecting-rods being arranged so as to form an inter-support lever, while the other connecting-rod being arranged so as to form an inter-resisting lever, said two connecting rods being each connected to a control rod having its end emerge on the front face of the carriage, the longitudinal sliding of these rods in the same direction producing, for each of the gathering cams, the same relative displacement direction with regard to the press cams.

12. A knitting machine according to claim 11, wherein said control rod comprises a lug whose end is engaged in an elongated slot of the carriage, a scale positioned on the edge of the slot, the end of the lug being visible on the upper face of the carriage, will show the relative position of the gathering cam, controlled by the rod, with regard to the corresponding press cams, said control rod having a threaded axle, and a nut integrally fixed to the carriage engaging said threaded axle for controlling, by its rotation, the longitudinal sliding of the rod and the working of the connecting-rod, attached to the gathering cam.

13. A knitting machine according to claim 12, comprising springs engaged and held in holes provided in the support plate of the carriage which ensure a resilient bearing of the leading edge of the gathering cams against the upper face of the needlebeds.

14. A knitting machine according to claim 1, including a carriage, said carriage comprising a plate, press cams carried by said plate, external flanges on said needlebed, means for supporting said carriage on the upper face of the needlebed, gathering cams each comprising a steel plate having a bent squared part along its working edges, means for resiliently pressing said bent parts against the needlebed, the hollowed part, comprised between the afore-mentioned bent edges, forming a zone inside which the body of the needles and the blade joined to the latter, can move freely.

15. A knitting machine according to claim 14, comprising a central plate having four corners and fixed to the plate forming the carriage, said central plate comprising, at its four corners, a bevelled catch sloped in the opposite direction to the dorsal face of the said central plate, the inclination of the bevelled catches exceeding that of the body of said plate so that its edges are arranged in the vicinity of the internal faces of the press cams.

16. A knitting machine according to claim 15, wherein said central plate includes bosses embedded in grooves formed in the lower face of the support plate, said bosses each having a central cavity separated from the edges of the plate by a wide surface so as to keep the needle blades lowered until the wool is distributed to the needles.

17. A knitting machine according to claim 1, including a knitting tension comb formed of several comb parts of a length corresponding to the width of the knitting to be effected, said comb parts being connected to each other by split sleeves holding these consecutive comb parts end to end.

References Cited in the file of this patent
UNITED STATES PATENTS 2,384,451   Brumbach _____ Sept. 11, 1945

FOREIGN PATENTS 1,074,118   France _____ Mar. 31, 1955